Figures 1, 2:
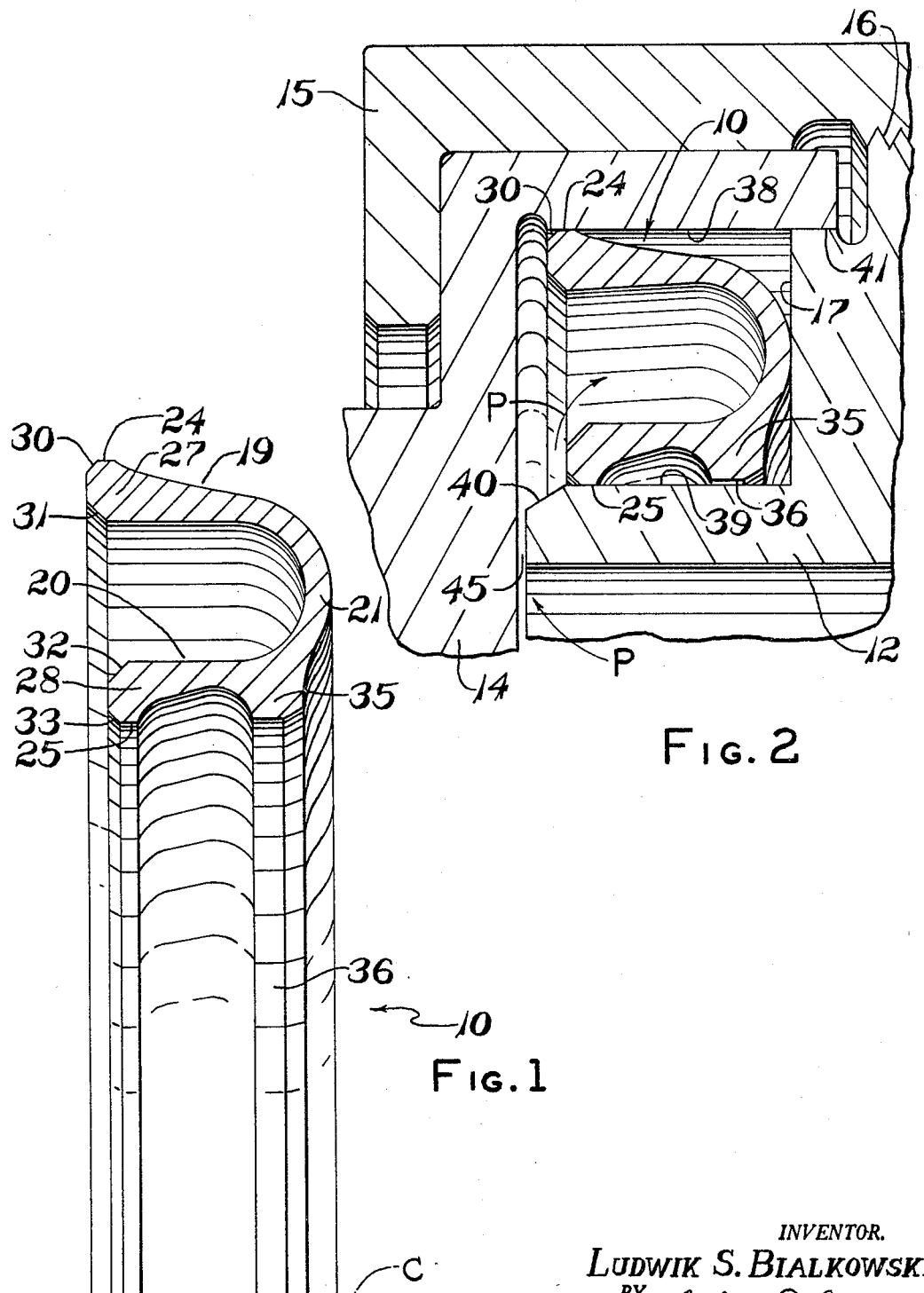

Oct. 18, 1966    L. S. BIALKOWSKI    3,279,806

SEAL ASSEMBLY

Filed Feb. 21, 1964

INVENTOR.
LUDWIK S. BIALKOWSKI
BY John D. Haney
ATTY.

United States Patent Office 3,279,806
Patented Oct. 18, 1966

3,279,806
SEAL ASSEMBLY
Ludwik S. Bialkowski, Troy, Ohio, assignor to The B. F. Goodrich Company, New York, N.Y., a corporation of New York
Filed Feb. 21, 1964, Ser. No. 346,444
2 Claims. (Cl. 277—205)

This invention relates to an improved fluid pressure seal assembly useful in hydraulic or pneumatic equipment between relatively static parts. More particularly, the seal assembly of this invention is an annular seal useful between two relatively stationary elements of a hydraulic assembly such as a concentric sleeve and cylinder.

A seal assembly according to this invention embodies a sealing element having an annular resilient rigid body of generally C-shaped cross section disposed so that one extremity of the C-shaped body is radially offset from the other relative to the axis of the body. The concave surface of the C-shaped body is directed to fluid pressure. Near each of the extremities of the C-shaped body, there is an annular sealing edge. One edge is directed radially outward and the other is directed radially inward. Each is engaged, respectively, with radially spaced concentric annular sealing surfaces of two parts of an apparatus between which fluid pressure is directed. The sealing element further includes an annular stabilizing surface on the body which is spaced axially from one of said sealing edges and fitted loosely in sliding engagement with the annular sealing surface engaged by the adjoining sealing edge. The stabilizing surface maintains proper alignment of the sealing edges with their respective sealing surfaces during assembly of the several parts.

In the assembly, either one or both of the extremities of the C-shaped sealing element is deflected toward the other, thereby slightly increasing the diameter of one sealing edge and slightly decreasing the diameter of the other sealing edge. The body of the sealing element is of maximum thickness at the extremities of the C-shaped sealing element and is thinner in the regions radially intermediate the extremities to facilitate the deflection of the body of the sealing element. The stabilizing surface is formed on an annular rib on the body of the element which is axially spaced from one of the sealing edges and is near an arched portion of the body which interconnects the two axially extending legs leading toward the thick extremities.

The invention will be further described with reference to the accompanying drawings which show, by way of example, a preferred seal assembly embodying this invention. In the drawings:

FIG. 1 shows a partial axial cross section of a sealing element of preferred design; and FIG. 2 is a fragmentary axial cross sectional view of a preferred seal assembly embodying the sealing element of FIG. 1.

The components of the seal assembly in FIG. 2 include an annular metal sealing element 10 in the form of a ring which is assembled with two parts 12 and 14 between which the ring 10 is radially squeezed. Parts 12 and 14 may be fastened together, for example, by a third part 15 which bears against part 14 and is threaded at 16 onto part 12. The parts 12, 14 and 15 represented in the drawing may be parts of any apparatus in which fluid pressure is contained. The sealing element 10 fits into a rabbet 17 in part 12 which is annular and concentric about the center line C of the sealing element indicated in FIG. 1. The sealing element 10 is subjected to fluid pressure on its concave side, the pressure being indicated by the small arrows P in FIG. 2.

The sealing element 10 is generally thin and is preferably of a resilient alloy steel. It may be of any metal which has sufficient rigidity, resilience, temperature resistance, and corrosion resistance to meet the particular service conditions. The element 10 has a body portion in the shape of an annular channel which is generally C-shaped in cross section. Two leg portions 19 and 20 are disposed axially of the body, one concentric of the other. The leg portions are of substantially equal length and are joined by an arched portion 21 at one side of the element. Near the outer extremity of leg portion 19 there is an annular edge 24 directed radially outward. Near the outer extremity of leg portion 20 there is another sealing edge 25 directed radially inward.

Each sealing edge 24 and 25 is preferably a cylindrical surface, the axial width of which is less than about 0.010 inch. If desired, these edges may be curved convexly or they may be actually knife edges. Any of these shapes provide essentially for line contact sealing engagement of the sealing edges with the parts 12 and 14 and thereby provide for higher unit pressures at the interfaces of the edges and the adjoining mating faces to improve the effectiveness of the seal. While line contact is preferred, certain advantages of this invention may be realized in many cases with sealing edges which are much wider, axially, than the foregoing recommended dimension. Accordingly, this dimension is not to be regarded as a critical or limiting feature unless specifically so stated in a claim. The sealing edges 24 and 25 in FIGS. 1 and 2 are drawn with a larger area relative to the remaining portions of the ring than is preferred in service to better illustrate the shape of the ring.

The sealing edges 24, 25 are formed on thick marginal portions 27 and 28, respectively, at the extremities of legs 19 and 20. The marginal portions are chamfered at 30, 31, 32 and 33. The legs 19 and 20 are tapered on their convex sides so that the legs become thinner at their junction with arch portion 21. Accordingly, when the leg portions are deflected toward each other, most of the deflection occurs in the arch portion 21.

The convex side of the sealing element is shaped with a smoothly curved contour toward an annular rib 35 on the convex side at the junction of leg portion 20 and arch 21. An annular cylindrical surface 36 is formed on this rib to locate and stabilize the position of the sealing element while it is being assembled with parts 12 and 14.

In the assembly of FIG. 2, the sealing edges 24 and 25 abut annular concentric surfaces 38 (on part 14) and 39 (on part 12) respectively. The radial distance between surfaces 38 and 39 is slightly smaller than the radial distance between edges 24 and 25 so that the leg portions 19, 20 of the sealing element are deflected slightly toward each other, the arch 21 resiliently yielding to accommodate this deflection. Preferably the diameter of sealing edge 24 is slightly greater than the diameter of its mating annular surface 38, whereas the diameter of sealing edge 25 is equal to or slightly smaller than the diameter of its mating sealing surface 39. The diameter of the stabilizing surface 36, however, is preferably of a size which is slightly larger than surface 39 to permit the rib region 35 to be slipped loosely over the surface 39. The axial width of stabilizing surface 36 may vary widely, its function being to maintain the sealing element in proper position on surface 39 until part 14 can be properly fitted over the seal and brought into complete sealing engagement with it. The inner leg 20 may be shaped in cross section to omit the curved cavity between edge 25 and rib 35. In other words surface 36 may extend axially all the way up to sealing edge 25 if desired.

In the initial stages of the assembly, the sealing element is fitted around surface 39 with the sealing edge 25 resting on an annular chamfer 40 on part 12 and with stabilizing surface 36 embracing surface 39. When part 14 is presented to the sealing element, the edge 41 of its sealing surface 38 will first engage chamfer 30 on portion 27 of the sealing element. As part 15 is progressively tightened on thread 16, the part 15 bears on part 14 to urge part 14 axially toward the sealing element, and the edge 41 of part 14 presses on chamfer 30 to deflect leg 19 until edge 24 comes into engagement with edge 38. This action causes edge 24 of the sealing ring to contract in diameter slightly (depending on the relative size of the diameters of edge 24 and surface 38) establishing an intense sealing load at the interface of edge 24 and surface 38. Additionally the axial force exerted on the sealing element by part 14 at this stage is adequate to displace the sealing element axially along sealing surface 39, the sealing edge 25 being forced to expand in diameter slightly until it comes into engagement with surface 39 with corresponding intense sealing pressure. The axial displacement of the element continues with further tightening of part 15 until the arch portion 21 of the body engages the end radial wall of rabbet 17 as shown in FIG. 2. The tightening of part 15 may be continued thereafter until the part 14 is displaced relative to the sealing element to whatever final position is desired for part 14. In the FIG. 2 assembly the limiting position of part 14 is shown wherein it is almost in engagement with part 12 at numeral 45.

Surface 38 of part 14 slides axially along edge 24 of the sealing ring as the part 14 is displaced to its final position. Ordinarily a part like part 14 will be positively restrained from turning relative to the sealing element (by other parts of the apparatus, not shown) as it is displaced. In any event, if not positively restrained, the part 14 could turn slightly relative to the sealing element without affecting the sealing integrity of the sealing element.

Intensive sealing loads, but of a smaller order, may be obtained at the interface of edge 25 and surface 39 if the diameter of edge 25 is initially about equal to the diameter of surface 39 and all the deflection of the sealing element occurs in the outer leg 19.

The fluid pressure acts on the sealing element in a manner to intensify the unit sealing pressure at the interface of the sealing edges and their adjoining surfaces.

If desired, the outer sealing surface 38 could be tapered slightly to smaller diameters in an axial direction leftward from edge 41 in FIG. 2 to increase the deflection of leg 19 and further intensify the sealing pressure on edge 24. This materially increases the force required to displace part 14 to its final position, however.

Variations may be made within the scope of the appended claims.

What is claimed is:

1. A seal assembly for static sealing service in a fluid pressure apparatus, said assembly comprising:
   (A) two parts providing two opposing annular concentric sealing surfaces between which fluid pressure may be directed;
   (B) a metal sealing element between said concentric sealing surfaces, said element having:
      (1) an annular rigid body having two concentric leg portions extending axially of the body, each said leg being of maximum thickness near its extremity, and a thinner arch portion resiliently interconnecting said leg portions at one end thereof so that the body is of generally C-shaped cross section and is disposed
         (a) with one extremity of one leg of said C-shaped body radially offset from the extremity of the other leg, relative to the axial center of said body, and
         (b) with the concave surface of the body intermediate said extremities directed to a fluid pressure between said parts, and
      (2) two annular line contact sealing edges on said body, in pressure sealing engagement with corresponding sealing surfaces of said two parts by virtue of the resilient deflection toward each other of the legs of said body on which said edges are formed and notwithstanding the presence of fluid pressure acting on the body,
         (a) one edge being directed radially outward near one extremity of the C-shaped body and engaged with the radially outer of said annular sealing surfaces, and
         (b) the other edge being directed radially inward near the other extremity of the C-shaped body and engaged with the radially inner of said annular sealing surfaces; and
      (3) an annular stabilizing surface on said body spaced axially from one of said sealing edges and fitted loosely in sliding engagement with the particular annular sealing surface engaged by its adjoining sealing edge,
         (a) said stabilizing surface being formed on a rib adjoining said arch portion and adapted for maintaining alignment of said sealing edges with their respective annular sealing surfaces during assembly of said parts and said sealing element.

2. A static metal sealing element for fluid pressure equipment comprising an annular rigid body having two concentric leg portions extending axially of the body, each said leg being of maximum thickness near its extremity, and a thinner arch portion resiliently interconnecting said leg portions at one end thereof so that the body has a generally C-shaped cross section with the annular extremity of one leg radially offset from the annular extremity of the other leg relative to the axial center of the body, an annular line contact sealing edge near the extremity of each such leg, the edge of one leg being directed radially outward and the edge on the other leg being directed radially inward relative to the axial center of the body, said edges being capable of resiliently changing in length to effect pressure sealing engagement with adjoining concentric sealing surfaces in response to resilient deflection of said arch portion when said legs are forced toward each other, and an annular rib on one leg of said body adjoining said arch portion and terminating in an annular stabilizing surface the diameter of which is proportioned to fit loosely in sliding engagement with a particular annular sealing surface engaged by the adjoining sealing edge to maintain alignment of said sealing edges wtih such sealing surfaces during assembly.

References Cited by the Examiner

UNITED STATES PATENTS

| 1,980,448 | 11/1934 | Stoddard | 277—205 X |
| 2,284,340 | 5/1942 | Nuckles | 277—205 X |
| 3,117,796 | 1/1964 | Liebig | 277—205 |

FOREIGN PATENTS

| 1,084,987 | 7/1960 | Germany. |
| 166,424 | 11/1955 | Sweden. |

LAVERNE D. GEIGER, *Primary Examiner.*

LEWIS J. LENNY, E. V. BENHAM, *Examiners.*

J. MEDNICK, *Assistant Examiner.*